H. MILLER.
SOLDERING MACHINE.

No. 190,888.                      Patented May 15, 1877.

Witnesses
John Becker
Fred Haynes

Inventor
Herman Miller
by his Attorneys
Brown & Allen

UNITED STATES PATENT OFFICE.

HERMAN MILLER, OF NEW YORK, N. Y.

IMPROVEMENT IN SOLDERING-MACHINES.

Specification forming part of Letters Patent No. 190,888, dated May 15, 1877; application filed April 26, 1877.

*To all whom it may concern:*

Be it known that I, HERMAN MILLER, of the city, county, and State of New York, have invented certain new and useful Improvements in Soldering Machines or Apparatus, of which the following is a description, reference being had to the accompanying drawing, which forms part of this specification.

My invention relates to machines or apparatus for soldering sheet-metal cans and other vessels; and consists in certain constructions and combinations of parts or devices for causing the margin or margins of the cans, during hold of the latter by traveling or traversing carriers, to be automatically immersed in a bath of molten solder, or primarily in an acid or other flux bath, then in the bath of molten solder, and subsequently, if necessary, in a water or cooling receptacle or trough, which operations or exposures may be repeated by employing consecutive series of said baths and receptacles or troughs, for exposure of a single seam, or for a successive exposure of the several sides or seams of the can to be soldered, according to the shape or description of said can.

Figure 1:
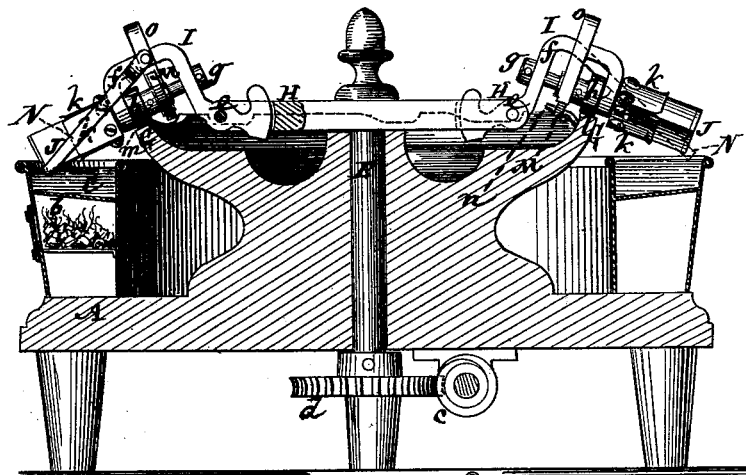
Figure 5:
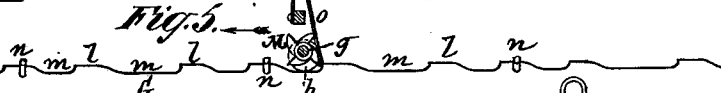
Figure 3:
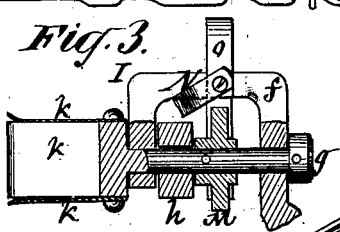
Figure 4:
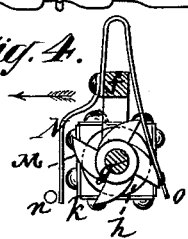
Figure 2:
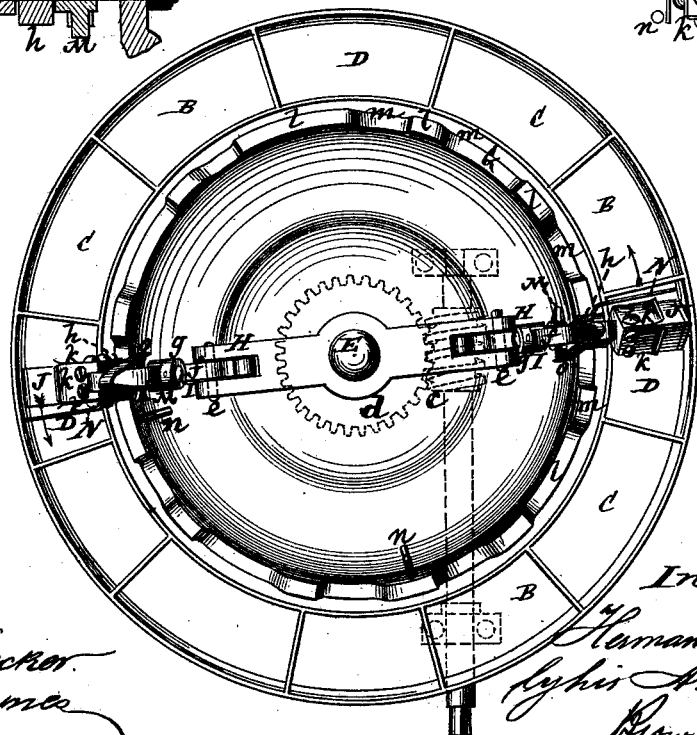

In the accompanying drawing, Figure 1 represents a vertical transverse section of an apparatus constructed in accordance with my invention, and organized for soldering the ends of rectangular or polygonal shaped cans. Fig. 2 is a plan of the same; Fig. 3, a longitudinal section of one of the can-traversing carriers, and Fig. 4 a section thereof. Fig. 5 is a view, in profile, of a sinuous track for giving a rising and falling motion to the can-carriers.

A is a circular stand or base, on and around which are mounted any number or series of consecutively-arranged troughs, B, C, D, the troughs B being designed to contain an acid or flux, the troughs C, which may have a furnace, b, under them, intended to contain molten solder, and the troughs D water or other chilling liquid.

The furnaces b may be heated by an ordinary coal-gas flame, or by a petroleum-gas flame, or otherwise, and a thermometer may be applied to the solder-troughs, to enable the attendant to regulate the temperature of the solder. Either an acid or rosin may be used as a flux in the troughs B.

E is a rotating vertical shaft, driven by a screw, c, and worm-wheel d, or otherwise, and arranged in concentric relation with the circular series of troughs B, C, D, and with a circular sinuous fixed track or cam, G, which occupies an elevated position within the space circumscribed by said troughs. Secured to the upper end of the shaft E are two or more arms, H, to the outer ends of which rising and falling can-carriers I are pivoted by their frames f, as at e. Each of these frames is fitted with a spindle, g, which inclines downwardly toward and over the troughs, or over the sinuous track G, upon which latter the forward end of each frame f, having its pivot e in the rear, rests—as, for instance, by a roller, h, on the spindle g of the carrier. This spindle has attached to its forward end a spring clamp or chuck, k, within or between which the can J, to be soldered at either of its ends or heads, is thrust endwise, leaving a portion of the can-body having the end or head to be soldered exposed.

The sinuous track G, by which, as the shaft E is rotated, the can-carriers I are made to rise and fall, has its undulations or raised portions l and depressions m arranged so that the can-carriers are lifted, when passing from one trough to the next, in succession, and are lowered, for a great or less interval during their passage through each trough, to effect the necessary immersion of the lower edges or margins of the exposed ends of the cans within the contents of the troughs. Both the length of the troughs and of the raised surfaces l and depressions m of the sinuous track G relatively with each other may vary to suit different exposure of the can to the contents of the trough, and to give time for entering and removing the cans within and from the chucks k.

On the spindles g of the can-carriers are tumblers M, which may be held in check by springs o, and be provided with as many teeth as the can J under operation has sides. As the can-carriers are traversed or rotated by the motion of the shaft E, the teeth of these tumblers successively come in contact with each one in succession of a series of studs or projections, n, arranged in the path of the traveling can-carriers. This causes the chucks k to be given a quarter or partial turn, and thereby to change the margins of the end of each can corresponding with the sides of the latter to dip, or so that said margins successively occupy a lowermost position, and the studs or projections n are arranged at such distances from each other that such partial turning of the can only takes place as the can leaves one series of acid, solder, and water troughs, B, C, D, and passes onto another series thereof. In this way, or by these means, the several edges of the can at its exposed end or head are successively soldered.

The acid or flux trough B may be fitted with a brush to rub in the flux, should the tin plate of which the can is composed be greasy.

Furthermore, the can-carriers I may be fitted with skimmers N, constructed and arranged to skim the oxide or impurities from the surface of the melted solder in the troughs as said carriers are traversed or rotated. Again, the water-troughs D may be provided with a rag or sponge, arranged to dip into the water, and to project above its surface, so as to come in contact with the soldered end margins of the can, instead of projecting the can directly into the water. This will chill the solder sufficiently to prevent it from running off, when the can is turned, without subjecting it to a too-rapid contraction and risk of breaking the joint.

There may be any number of can-carriers and arms H traversing said carriers; also, any number of soldering-troughs, according to the diameter or size of the machine, which may be of considerable proportions, to provide for soldering several cans at a time.

Changes in the form of the can or in the position of the joint to be soldered will generally require corresponding changes in the construction of the apparatus, and numerous other changes may be made in the working details of the latter without departing from that peculiarity of my invention, which consists in the employment of one or more traversing can carriers or holders, which are not restricted to any particular plane of motion, and a sinuous track or device, causing said carries to rise and fall, and effecting the successive immersion of the can in a series of baths or troughs, as described. This may be done either with the parts organized as described or otherwise organized, including a traversing arrangement of the carriers in a straight direction, and not in a circular one; or, when in an endless course, not necessarily in a circular one, the sinuous track or device, which controls the rising and falling of the carriers, and the baths or troughs into which the cans are successively immersed being arranged to correspond. Furthermore, the sinuous track or device may be in two or more sections, according to the number of margins to be soldered.

The apparatus may be organized to solder one or more side seams in the can, and it is not necessary in every case that, even when the can to be soldered is a polygonal one, the can should be turned any one given number of times, as such can may have but one, two, or more seams.

For soldering round cans the apparatus may be organized to cause the can, to make one complete revolution in each bath or trough, and to lift or lower the can, as hereinbefore described, when traversing from trough to trough and through the latter; but in thus soldering the ends or heads of cylindrical cans the water or chilling baths or troughs may be dispensed with, as the molten solder will only run round the joint of the cylindrical can, and not collect in one spot, as it is liable to do after turning the polygonal can into a vertical positon. Sectional racks on the sinuous track and pinions on the spindles of the can-carriers may be used to rotate the cans while passing through the troughs, but not while being transferred from one trough to another.

The only manual labor necessary in working an apparatus such as has here been described is to put the cans in and to take them out of their chucks or holders, to keep up the requisite supply of flux, solder, and water in the troughs, and to attend to the fires in the furnaces.

I claim—

1. The combination of one or more traversing can-carriers, having also an intermittent rising and falling motion, with one or more series of troughs, into which the cans or vessels to be soldered are successively dipped, and from which they are successively removed, by said rising and falling motion during the traversing motion of the carriers, substantially as specified.

2. The combination, with one or more traversing can-carriers and one or more series of troughs, of a sinuous track or device, organized to project the can to be soldered into each trough in succession, and to remove it therefrom while passing from one trough to another, essentially as described.

3. The combination, with means for communicating to the traversing can-carriers an intermittent rising and falling motion as they successively pass through or over and from a series of troughs, of means for turning or rotating the chucks which hold the cans, substantially as specified.

4. The combination of the circular sinuous track G, with the rising and falling can-carriers I, arranged to rotate on and around said track, the inclined shafts g, provided with clasps or chucks for holding the cans, and two or more series of troughs, B, C, D, substantially as and for the purposes herein set forth.

5. The skimmer N, in combination with the traversing and rising and falling can-carriers I, and the troughs through which the cans are successively traversed by said carriers, essentially as described.

HERMAN MILLER.

Witnesses:
HENRY T. BROWN,
FRED. HAYNES.